United States Patent [19]

Marshall

[11] 4,166,540
[45] Sep. 4, 1979

[54] DOCUMENT SORTER UTILIZING CASCADED SORTING STEPS

[75] Inventor: Robert Marshall, Clinton, Iowa

[73] Assignee: A. C. Nielsen Company, Northbrook, Ill.

[21] Appl. No.: 872,359

[22] Filed: Jan. 26, 1978

[51] Int. Cl.² .............................................. B07C 5/34
[52] U.S. Cl. ................................. 209/555; 209/583; 356/71; 235/375
[58] Field of Search .................... 209/73, 74 R, 74 M, 209/75, 82, 111.5, 111.6, 111.7 R, 555, 558, 569, 583; 250/556, 560; 356/71; 235/375, 425

[56] References Cited

U.S. PATENT DOCUMENTS

| | | | |
|---|---|---|---|
| 2,950,799 | 8/1960 | Timms | 194/4 R |
| 3,480,785 | 11/1969 | Aufderheide | 209/111.6 X |
| 3,774,040 | 11/1973 | Stephanos | 250/560 |
| 3,800,155 | 3/1974 | Potenza | 209/75 X |

Primary Examiner—Joseph J. Rolla

Attorney, Agent, or Firm—Mason, Kolehmainen, Rathburn & Wyss

[57] ABSTRACT

An automatic document sorter particularly suitable for sorting retail store coupons employs a plurality of relatively coarse sorting processes in cascade. The sorting processes sequentially sort the documents according to predetermined properties of the document, including codes, such as bar codes or the like; physical properties, such as size, thickness, color, reflectivity and opacity; the characteristics of the inscriptions on the face of the document; and any uniquely marked areas of the document face. Such a sorting hierarchy permits the documents to be sorted rapidly by reducing the precision required in each sorting step. The hierarchy also permits each document to be classified during each sorting step as falling into a particular class of documents in order to simplify subsequent sorting steps. If a property uniquely identifying the document is found during any one of the sorting steps, the processing is terminated at that point without completing the subsequent sorting steps.

26 Claims, 15 Drawing Figures

DOCUMENT SORTER UTILIZING CASCADED SORTING STEPS

BACKGROUND OF THE INVENTION

A. Field of the Invention

This invention relates generally to automatic document sorting machines, and more particularly, to machines suitable for automatically sorting retail store coupons or the like.

B. Description of the Prior Art

Automatic document sorting devices are known. Such devices are generally specialized for reading particular types of documents, such as mail, currency, checks and bar coded merchandise tags. Consequently, such reading machines are designed to read specialized data associated with such articles, such as magnetic ink present on checks, bar codes present on merchandise tags and certain classes of mail, and the particular portions of currency indicating the denomination.

While such devices operate satisfactorily for sorting documents having certain predetermined characteristics and relatively uniform size, these devices are generally incapable of reading documents such as store coupons that have a variety of shapes and sizes, but which may otherwise be difficult to differentiate from each other. Consequently, the sorting of merchandising coupons is usually done manually.

One of the problems associated with present day redeemable merchandising coupons is the amount of handling required in the redemption process. Firstly, the coupon must be manually redeemed at the point of sale by a retailer, who subsequently sorts the redeemed coupons and sends them to the manufacturer issuing the coupon or to a clearing house. When the coupons are received by the clearing house, they are manually read and sorted, and the account of the retailer submitting the coupons is credited with the aggregate value of the coupons plus an appropriate handling charge, while the various manufacturers' accounts are debited. In addition, a report is submitted to certain manufacturers indicating the number and value of coupons redeemed, the origin of the redeemed coupons (i.e., whether they originated in a newspaper, magazine or box top), the regions of the country in which the coupons were redeemed and other information.

The manual handling of coupons requires a considerable amount of time, both at the point of sale and at the clearing house. At the point of sale, the coupon must be visually inspected and a determination made as to whether the product called for by the coupon was purchased. The coupons must then be sorted and sent to the appropriate manufacturers or clearing houses. At the clearing house, the coupons are again visually inspected to determine if they are valid (e.g., unexpired) and sorted according to offers. After the coupons have been sorted according to offers, the coupons relating to each offer are counted, and the appropriate reports are generated.

Typically, each manufacturer has a large number of offers outstanding relating to various products and to various sizes and flavors of that product. In addition, different offers are made by publishing similar coupons in various magazines, newspapers and other publications. When this is done, the manufacturer usually desires to know the origin of each coupon in order to determine the effectiveness of his advertising campaign. Therefore, coupons relating to the same product which appear in different publications are typically segregated under different offers, each being identified by a different offer number. The number of separate offers is quite large, and each coupon must be segregated according to offer. This requires a rather complicated segregation process that requires each coupon to be handled twice, that is, first during the inspection process in which the coupons are segregated according to offers, and then during a counting process where the coupons relating to each offer are counted. Such a duplication of handling is time consuming and expensive; however, to date, no automatic sorting device capable of handling a large number of diverse coupons having a wide variety of physical characteristics and at the same time being able to differentiate between virtually identical coupons from different offers has been developed.

SUMMARY OF THE INVENTION

Accordingly, it is an object of the present invention to provide an improved document sorter that overcomes many of the disadvantages of the prior art document sorters.

It is another object of the present invention to provide a document sorter capable of sorting merchandising coupons.

It is still another object of the present invention to provide a document sorter capable of sorting a wide variety of documents.

It is still another object of the present invention to provide a document sorter capable of differentiating between very similar documents while operating at a high rate of speed.

It is yet another object of the present invention to provide a document sorter that sorts a wide variety of documents by utilizing a plurality of cascaded sorting processes in order to maintain accuracy while retaining high speed operation.

It is still another object of the present invention to provide a coupon sorting machine usable in a clearing house operation or at a point of sale.

In accordance with a preferred embodiment of the invention, an automatic document sorter that performs a plurality of cascaded sorting steps is provided. The various sorting steps may classify the documents according to physical properties, such as size, thickness, color, reflectivity and opacity; codes, such as bar codes or the like; the characteristics of the inscriptions on the face of the document; and any uniquely marked areas on the document face. The use of such a sorting hierarchy permits the accuracy of each individual sorting process to be reduced, thereby increasing sorting speed, without decreasing the sorting accuracy of the overall system. Moreover, such a hierarchy allows the machine to utilize information contained in the various physical properties of the document, which would ordinarily be a hindrance to the sorting process, to obtain information useful in identifying the document. In fact, many documents can be sorted according to physical properties only, many of which are unique to a particular document, and permit the document to be immediately identified without further processing. If not immediately identified by the physical property sorting process, the document can at least be classified as a member of a class of documents numbering fewer than the total number of ducuments. Such as classification will simplify subsequent sorting processes by reducing the number of comparisons that must be made. Thus, the wide variety of physical properties of a coupon which would normally be detrimental to the operation of most document sorting machines is used to advantage in the sorting process of the machine according to the present invention.

Some coupons presently used employ a bar code or the like printed on the face of the coupon. These bar codes can be readily located and scanned by the device according to the present invention, and used to define the coupon uniquely. The code reading capability used in conjunction with the physical properties reading capability uniquely identifies many of the coupons, and significantly reduces the number of coupons that must be retained for further processing. Thus, the more sophisticated processing capabilities of the machine are reserved for coupons that are very similar to each other.

DESCRIPTION OF THE DRAWING

These and other objects and advantages of the present invention will be more readily understood upon consideration of the detailed description and attached drawing wherein:

FIG. 8, including FIGS. 8a and 8b, is an illustration of a physical properties sensor module and illumination source utilized by the system according to the invention;

DETAILED DESCRIPTION OF THE PREFERRED EMBODIMENT

General

Figure 1:
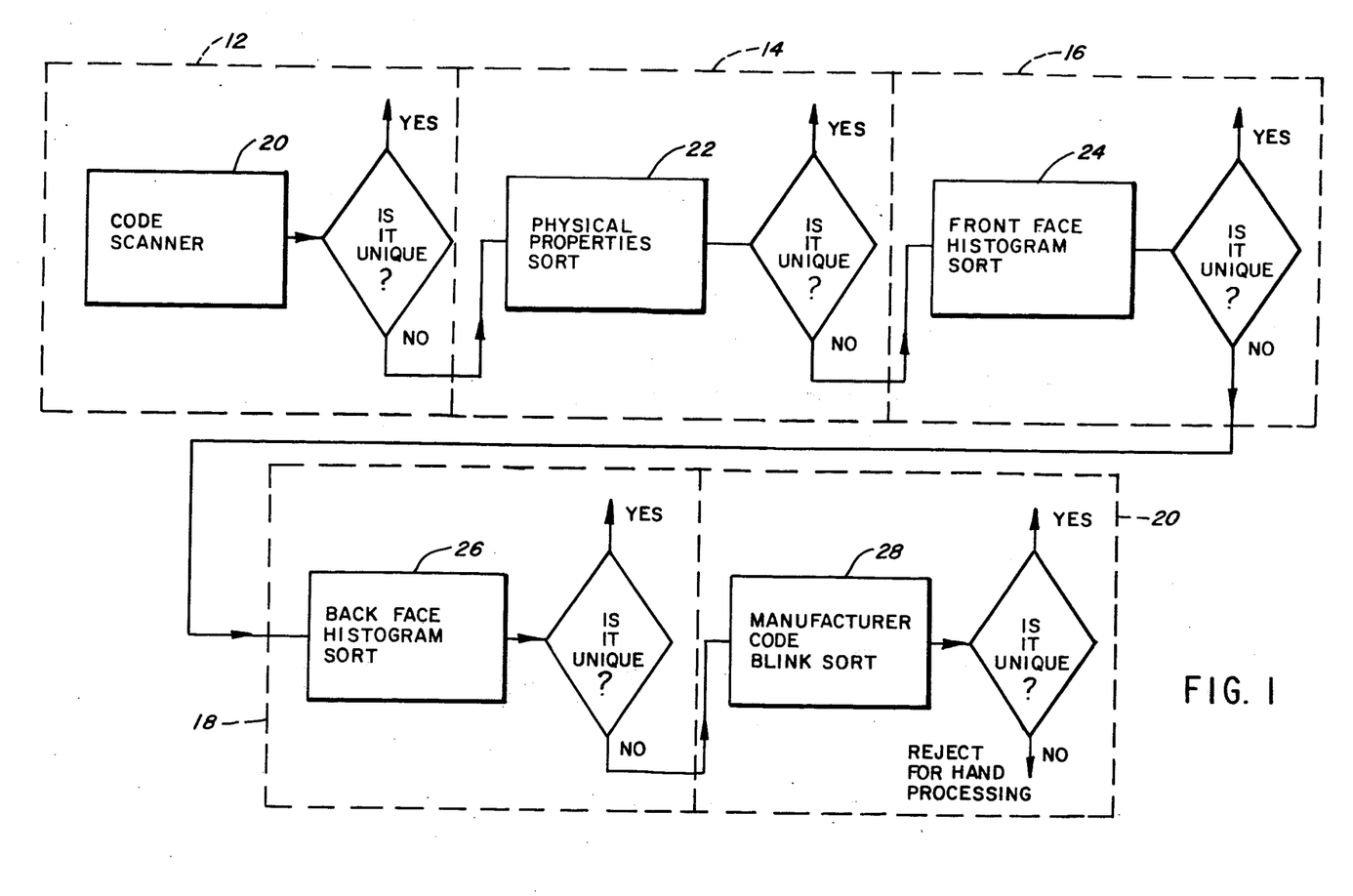
FIG. 1 is a flow chart indicating the decision hierarchy of the system according to the invention.

The basic decision hierarchy is illustrated in FIG. 1 and utilizes, in this embodiment, five subsystems 12, 14, 16, 18 and 20. In the illustrated system, the coupon or other document is first scanned by a code scanner 20 to determine the existence of a bar code or other code. The scanned code is then compared with various codes stored in the system memory to determine if it is unique. If a unique match is found, the coupon is identified. If no unique match is found, a physical properties sorting step 22 is initiated. The physical properties sort 22 determines the physical properties, such as size, thickness, color, reflectivity, luminescence and opacity of the document. If a unique physical property by which the coupon can be identified is found, the sorting process is terminated. If no unique property is found, a front face histogram sort 24 is performed. The front face histogram sort generates a histogram from the inscriptions on the front face of the coupon for comparison with internally stored histograms. As in the previous steps, if a unique match is found, the coupon is identified, otherwise it is further sorted in a back face histogram sort 26. In each of the above steps, even if no unique property is found, a partial address representing a subclass into which the document falls is generated and stored in order to reduce the number of comparisons that must be made in subsequent sorting steps. If the coupon is not uniquely identified in the physical properties and histogram sorts, the manufacturer code printed on the coupon is read during a manufacturer blink sort process 28. A blink sort is utilized so that the comparison with each item stored in the memory is terminated as soon as a mismatch is found, thus making it unnecessary to compare the entire scanned manufacturer code with each item stored in the memory.

As can be seen from FIG. 1, each successive sorting step sorts the coupons according to increasingly finer characteristics. Moreover, the information gleaned from each individual sorting step may be combined with the information derived from previous sorting steps to permit a ready identification of each coupon without necessitating extreme accuracy in each sorting step. For example, two coupons may have similar front face histograms but different reflectivities or thicknesses. Thus, each of the coupons may be identified from the combination of the histogram information and the physical properties information. This permits a coarser front face histogram sort to be utilized than if the physical properties information were not used, and eliminates the need for a highly accurate and time consuming front face histogram. Only when the coupon is not identified after several relatively coarse sorts is the relatively fine manufacturer code blink sort 28 utilized. However, the number of coupons that are not identified prior to reaching the manufacturer code blink sort 28 is small compared to the total number of coupons processed, thus the manufacturer code blink sort does not appreciably slow down the sorting process. Excessively mutilated coupons, invalid coupons and coupons that have not been programmed into the system are automatically rejected, and may be hand processed.

Figure 2:
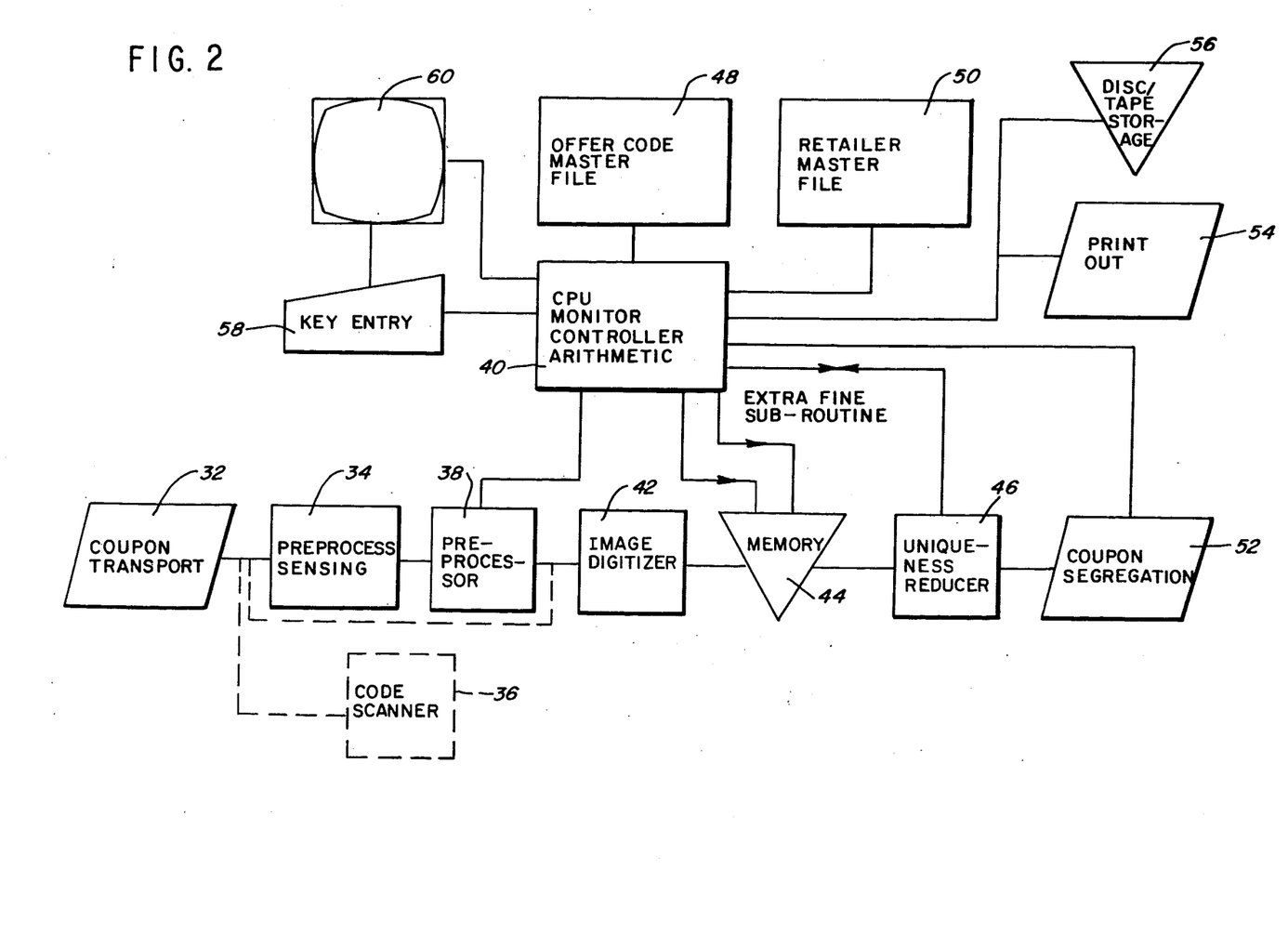
FIG. 2 is a block diagram of the system according to the invention.

A block diagram of a system capable of performing the functions described in conjunction with FIG. 1 is illustrated in FIG. 2. A coupon transport 32 is utilized to move the coupons past recognition points and eventually to segregate the coupons into several groupings. The coupon transport may be friction fed or utilize a vacuum pickup, and for example, a transport such as the transport utilized in currency sorting machines manufactured by The Brandt Company may be utilized. Such a transport is capable of feeding documents at a rate of 72,000 per hour.

A preprocess sensing module 34 is utilized to sense the length, width, transparency, color, thickness and reflectivity of the coupon, and a code scanner 36 is used to scan the coupon for the presence of a UPC code or other coded information. The code scanner 36 may be placed ahead of the preprocess sensing module 34 as shown, or at any convenient position. A preprocessor 38 converts the output of the preprocess sensing module to a digital word that is accepted by a central processing unit 40, such as the Microproc 16 unit sold by Plessey Corporation, to initiate a coarse search based on physical properties before any image processing is initiated. If no preprocessing or code scanning is desired, the preprocess sensing module 34, the code scanner 36 and the preprocessor 38 may be eliminated, and the image processing initiated immediately.

An image digitizer 42 is utilized in the image processing step. The image digitizer 42 includes a high resolution camera that provides an analog signal representative of the image on the coupon. This analog image is digitized by the digitizer and transferred to a memory 44. A stop motion device, such as a strobe light or shutter mechanism, may be employed within the image digitizer 42 visually to stop the motion of the coupon as it passes through the digitizer. A uniqueness reducer 46 reduces the data from the image digitizer to a form having the simplest unique characteristic. The uniqueness reducer 46 is connected in a loop with the central processing unit 40 and the memory 44 to initiate an extrafine subroutine wherein the system could be directed to zoom in on a particular area of the coupon, such as the offer number which had previously been entered, to generate an extrafine reading of the coupon such as that required in the manufacturer code determining process.

The data for the various coupons to be sorted is stored in an offer code master file 48. The offer code master file 48 contains each offer number and the data for recognizing the coupons associated with that offer number. Groups of offer numbers pertinent to each coarse sorting step would be stored in the offer code master file from which the individual offer could be deduced after a sufficient number of sorts are made. Individual offers for the manufacturer code blink sort would also be stored. A retailer master file 50 could contain the information necessary to identify various retailers.

A coupon segregator 52 utilizing mechanical diverters in the coupon transport 32 segregates coupons according to any characteristic determined by the central processing unit 40. A printout 54 is utilized to provide a statistical summary of the coupons sorted and any other desired statistical information. The information gleaned from the coupons is also stored on a disc or tape storage medium 56 for further processing, if desired. A key entry device 58 is utilized for controlling the operation of the system, for entering information required by the system, and to enter data from coupons that were manually read. The output of the device is also displayed on a display 60.

Physical Properties Sorter

The physical properties of the document can readily be described by a 16-bit word because discrimination between properties is kept at a relatively coarse level. For example, the length feature has been studied in great detail, and it was found that most coupons can be categorized into seven lengths. Thus, a three-bit byte will characterize this feature. Similarly, two- to three-bit bytes are used to characterize the other features within the 16-bit descriptor word.

Figure 3:
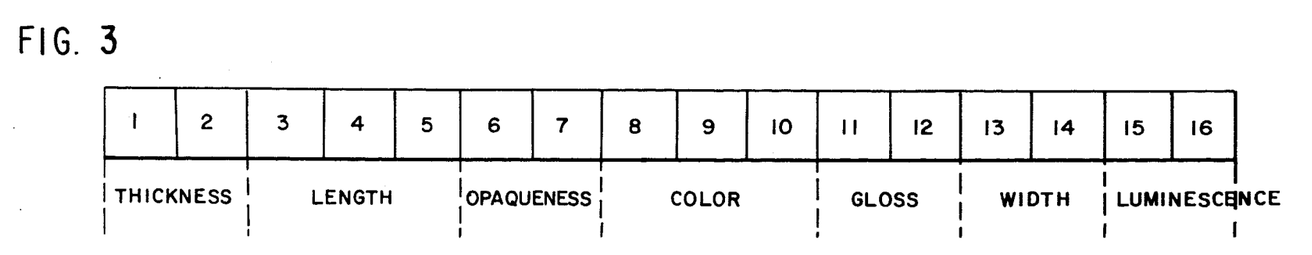
FIG. 3 is a representation of a word used to describe one of the documents being sorted.

A typical descriptor word is illustrated in FIG. 3. For example, bits 1 and 2 can categorize the thickness into three categories, for example, less than 11 mils, 11-20 mils and more than 20 mils. Bits 3, 4 and 5 categorize the length into seven categories ranging from less than 1 inch to more than six inches. Bits 6 and 7 define three categories of opaqueness which can be categorized as transparent, semi-opaque and opaque. Bits 8, 9 and 10 define the dominant color and they may be used to indicate no dominant color, or to indicate whether red, orange, yellow, green, blue or violet is the dominant color. Bits 11 and 12 define three categories of gloss, such as shiny, semishiny, or dull. The width of the coupon can be broken down into three categories, for example, less than two inches, two to 2½ inches and more than 2½ inches. The luminescence, or quantity of light emitted from the surface of the coupon under ultraviolet light excitation can be categorized into intense, medium and low luminescence categories by the bits 15 and 16. Thus, all of the physical properties of each coupon can be categorized by a single 16-bit word which is then compared with similar 16-bit words stored in the offer code master file 48 in order to determine the offer number. If the total number of offers is limited, and the coupons sufficiently different, the physical properties sorter can be used alone to sort the coupons. Also, such a physical properties sorter can be used to generate a coarse search that can sort those coupons that are identifiable from their physical properties. The coupons that are not identifiable by the system would be sorted by hand.

Decoder

The code scanner 36 can be a Universal Product Code or any other type of bar code or target code scanner known in the art. This decoder can either precede or follow the physical properties sorter, or be used alone to identify coded coupons and to detect noncoded coupons. The noncoded coupons could then be hand sorted, or sorted by another machine.

Histogram Sorting

In order to scan a document optically, the coupon or document must have some definable symmetrical feature that can serve as an indexing reference for the computer software. All merchandising coupons examined thus far do have such a reference in the form of a rectangular feature, such as a coupon edge, an artistic frame or a cutout guide which may be used to provide a reference for the scanning process. A complete rectangle is not necessary, provided that each edge retains some portion of the original frame to permit regeneration of the rectangle, as necessary, in the case of mutilated coupons. The length and width measurements obtained from this rectangular feature may also be used in the physical properties sorting system.

Figure 4:
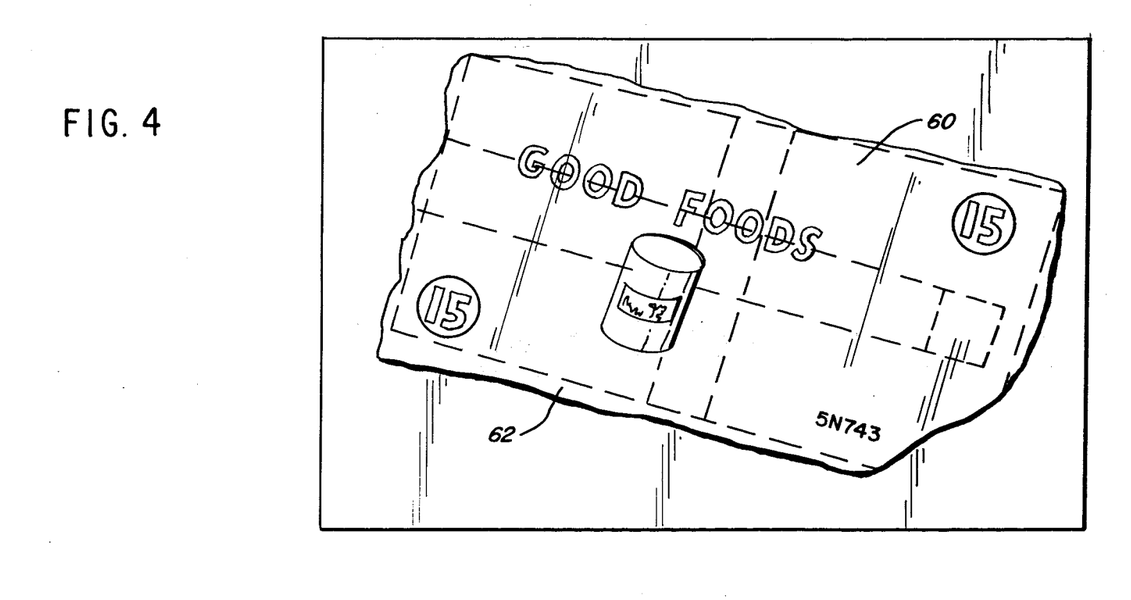
FIG. 4 illustrates an image of a coupon being viewed by the system according to the invention.

FIG. 4 shows the image of a coupon as it appears in the memory. The memory stores the image in a plurality of individual storage units known as pixels, each containing one bit of information indicating either black or white. For example, the memory may contain 150,000 pixels from a 300-pixel vertical by 500-pixel horizontal raster. The information to generate the stored pixels is obtained from the camera during the stop motion strobe. The information may be obtained in analog form from a light sensitive surface such as that found in a vidicon tube, or in digital form from an array of photosensitive detectors within the camera.

A typical coupon 60 (FIG. 4) is shown in a typical scanning field. The coupon is rotated with respect to the horizontal and vertical coordinates of the scanning field, so the orientation of the coupon must first be determined before the histogram can be obtained. This is accomplished by searching the field for the largest rectangular feature using a standard contour and symmetry restoration program to locate a border such as the border 62. Once the orientation of the coupon is determined, predetermined areas of the coupon can be scanned to provide the histogram. The areas to be scanned will have been determined previously, and chosen on the basis of where most coupons contain the maximum amount of different data. For example, scanning lines bisecting the sides of the coupon (FIG. 4) or diagonal scanning lines may be used.

Because of the large number of pixels forming the image of the coupon 60, information must be integrated in order to generate a word having a usable length. For example, if a 16-bit word histogram is desired, each bit of the word can be derived by combining the values of approximately 560 original pixels as the coupon is scanned along one of the scanning lines. A second 16-bit word histogram may then be generated in a similar manner as the coupon is scanned along the other scanning line, for example, the vertical.

The two histograms thus obtained characterize the gross features of one face of the coupon. A similar procedure is used to scan the other side of the coupon, and to develop a second two-word histogram. Such scanning of the second side of the coupon is primarily used to identify similar coupons that appear in different newspapers and have different reverse images.

After the histograms characterizing the gross features of the coupon have been developed, a lookup procedure of the offer code master file 48 is initiated by the central processing unit 40. The lookup procedure attempts to match the data, or partial address, obtained from the physical properties sort and the histogram words that were developed with partial addresses and reference histograms for both faces of the coupon contained in the master file 48. If the partial address and the four-histogram words are matched, the coupon is identified; if not, the coupon is routed for further processing.

In practice, only a very few coupons will not have been identified after the histogram sort. However, after the histogram sort, information relating to the coordinates and orientation of the coupon has been obtained. This permits a particular field to be located and scanned, thus permitting the manufacturer code to be scanned directly. The position and size of the field to be scanned has been pre-entered in the offer code master file 48 along with the other data relating to each offer number. The manufacturer code may be read using a variety of optical scanning techniques, or by determining the total black/white count in the scanned area or in an expanded histogram of the scanned area. However, in a preferred mode, the comparison of the scanned manufacturer code with file entries is based on a blink sorting system. In such a blink sorting system, the word defining the manufacturer code is subtracted from the various file entries on a bit-by-bit basis. As soon as no cancellation occurs (a blink), that offer is rejected and a comparison with the next offer in the file is made. Thus, the blink sorting system increases the speed of the device by permitting an incorrect offer number to be rejected as soon as a mismatch occurs without having to compare the entire word.

Figure 5:
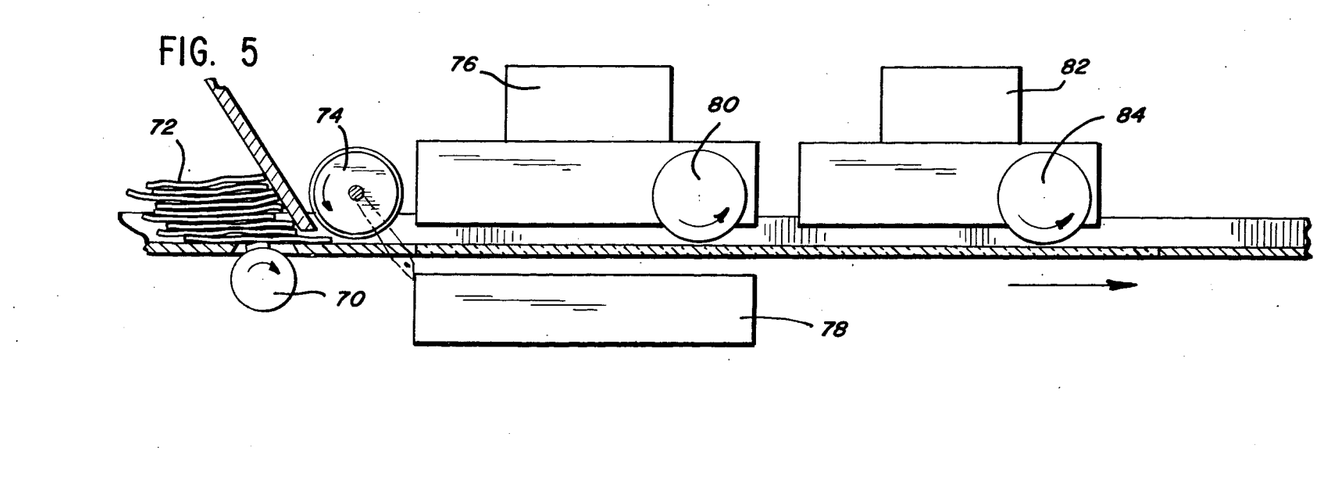
FIG. 5 is a side view of a document transporting mechanism and sensing stations utilized in conjunction with the system according to the invention.
Figure 6:
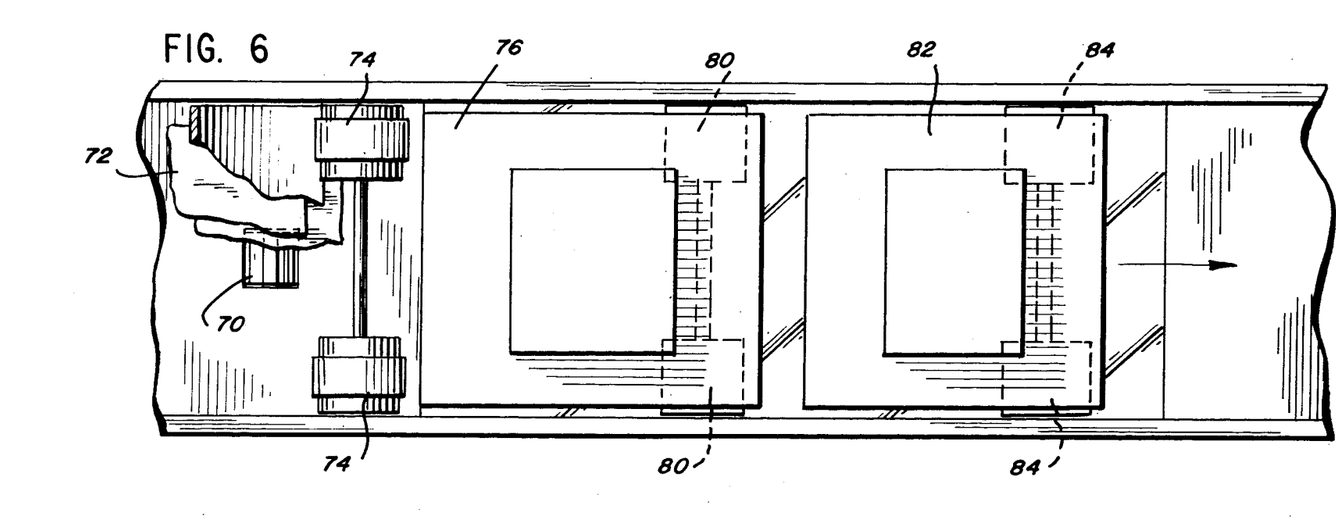
FIG. 6 is a top view of the transport mechanism illustrated in FIG. 5.
Figures 7, 10:
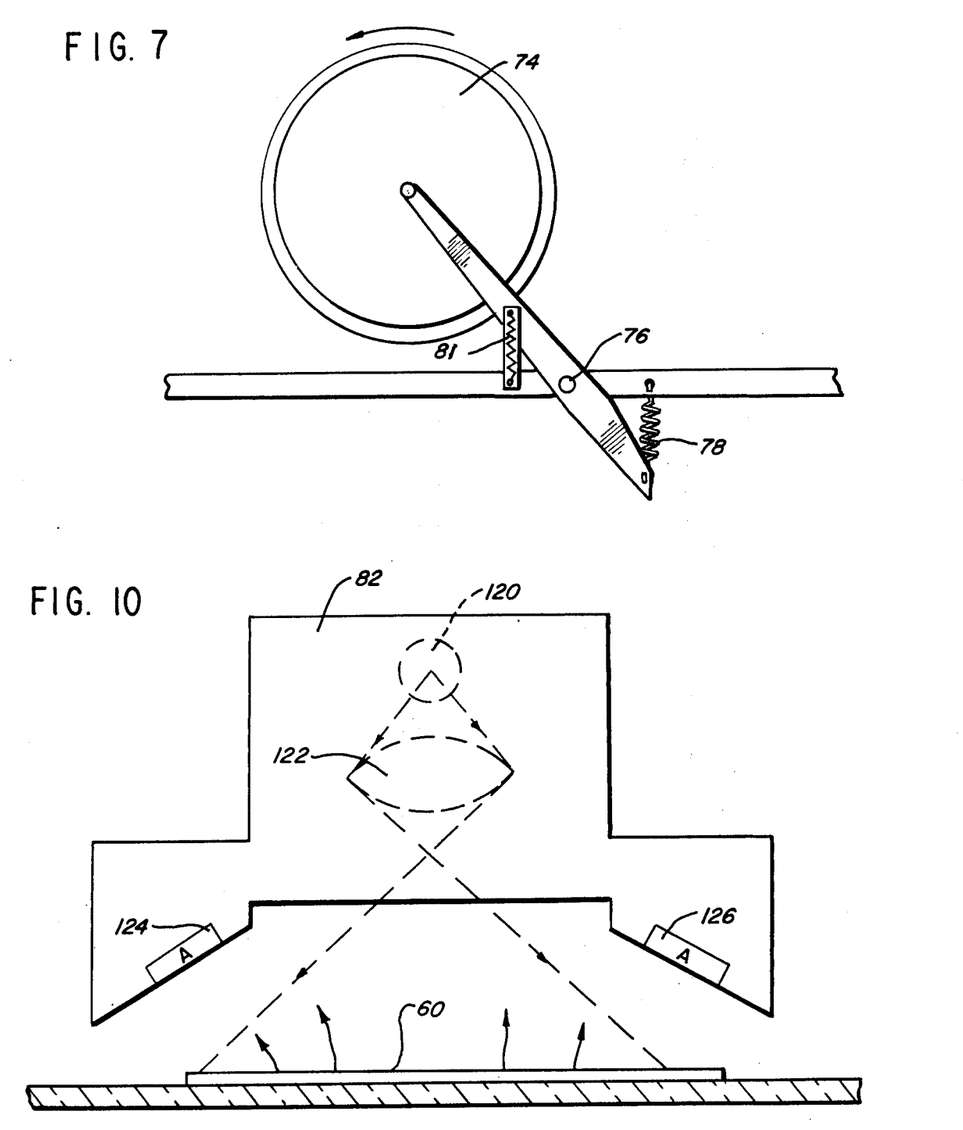
FIG. 7 is an enlarged diagram of a floating stripper utilized in the transport mechanism illustrated in FIGS. 5 and 6.
FIG. 10 is a side view of a luminescence sensor and illumination source utilized by the system according to the invention.

A schematic view of the mechanical apparatus necessary to provide the scanning for the system according to the invention is shown in FIGS. 5 and 6. The system employs a stripper 70 for removing a single coupon from a coupon stack 72 and transporting it beneath a floating stripper 74 (FIGS. 5-7). The floating stripper 74 is pivoted about a point 76 and resiliently biased by a spring 78 or the like to maintain the stripper 74 in contact with the surface of the coupon being fed by the stripper 70. A strain gauge 81 determines the position of the stripper 74 and provides an indication of the thickness of the coupon.

After the coupon has emerged from the floating stripper 74, it is passed between a color and reflectance sensing module 76 and length, width and opacity sensing module 78. A stripper 80 located near the modules 76 and 78 serves to transport the coupon to a luminescence sensor 82 that contains another stripper 84 ganged with the strippers 70 and 80.

Figures 8, 8A, 8B:
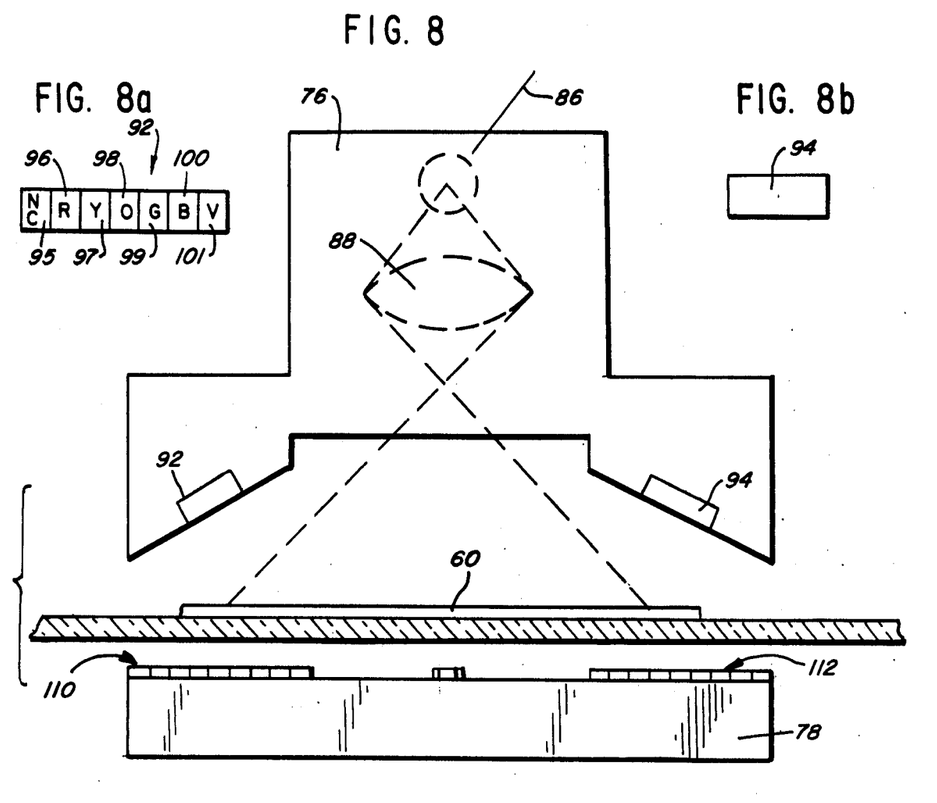

The color and reflectance module 76 utilizes a light source 86, such as an incandescent or fluorescent light, or the like, and an optical system, represented by a single lens 88 in FIG. 8, to flood the coupon 60 with light from the visible spectrum. The light reflected from the coupon 60 is sensed by a color sensor 92 and a reflectance sensor 94.

In the present embodiment, the color sensor 92 is comprised of a plurality of individual photodiodes 95-101, each adapted to sense a different color. This is accomplished by placing a different color filter in front of each of the photodiodes 95-101. For example, the photodiode 95 does not utilize a filter and provides the greatest output when none of the colors is predominant. The photodiode 96 utilizes a red filter; diode 97 a yellow filter; diode 98 an orange filter; diode 99 a green filter; diode 100 a blue filter and diode 101 a violet filter. Thus, the diode associated with the filter corresponding to the predominant color of the coupon 60 will provide the largest output.

The reflectance sensor 94 utilizes either a large area photodiode or an array of interconnected photodiodes to provide a signal proportional to the total amount of light falling on the photodiode 94. A large area diode, or a large number of diodes, are utilized to integrate the light impinging on the detector 94 to reduce or eliminate errors resulting from surface aberrations and anomalies.

Figure 9:
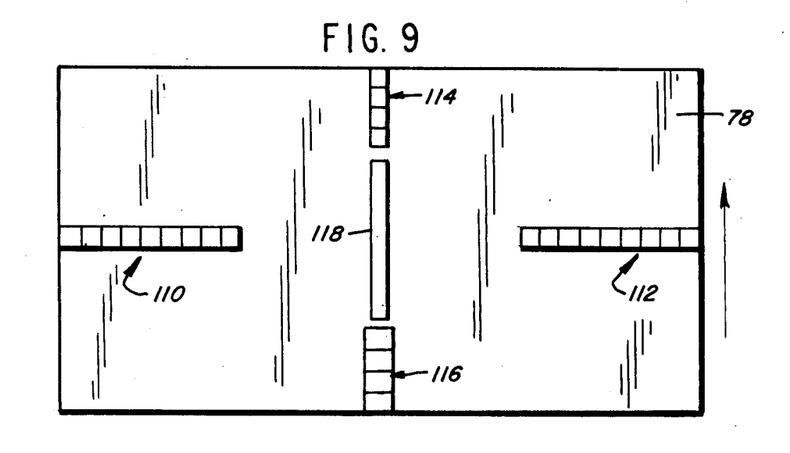
FIG. 9 is a top view of the sensor module illustrated in FIG. 8.

The length, width and opacity module 78 (FIGS. 8 and 9) is disposed beneath the coupon 60 and utilizes a pair of length sensing arrays of photodiodes 110 and 112 and a pair of width sensing arrays of diodes 114 and 116. In addition, a large area photodiode 118 is employed to sense the opacity of the coupon. Thus, when a coupon, such as a coupon 60, passes between the light source and optical system 86, 88 and the length, width and opacity sensing module 78, certain ones of the photodiodes of the length arrays 110 and 112 and certain ones of the diodes of the width arrays 114 and 116 will be shadowed by the coupon 60. Thus, the length and width of the coupon 60 can readily be determined. A large area photodiode 118, similar to the large area photodiode 94, is used to measure the opacity of the coupon 60. As in the case of the diode 94, the opacity sensing diode 118 may be comprised of a large area diode or a plurality of interconnected smaller diodes to provide a signal representative of the integrated light passing through the coupon 60.

The luminescence sensing module 82 (FIG. 10) is similar to the color and reflectance sensing module 76, and utilizes a source of ultraviolet light 120, rather than the source of visible light 86 used in the module 76. The luminescence sensing module 82 also uses an optical system designated by the lens 122 which is similar to the optical system designated by lens 88. The focused light from the source 120 is projected onto the coupon 60 and detected by a pair of photodiodes 124 and 126. As in the case of the sensor 76, the luminescence sensor 82 can be used to sense both the quantity of the light emitted from the coupon 60 (luminescence) and the spectral density of the reflected light. This is accomplished by utilizing a multiplicity of photodiodes in the sensor 124, each associated with a different filter in the luminescence band as the detector 124. Thus, the detector 124 may be similar to the detector 92 except that the filters would pass certain frequencies of the luminescence spectrum rather than the reflected light spectrum to the various diodes. To determine luminescence, a large area diode or a plurality of interconnected diodes can be used as the luminescence detector 126. The signals derived from the various sensors are then quantized and applied to the various logic circuits shown in FIG. 2.

Figure 11:
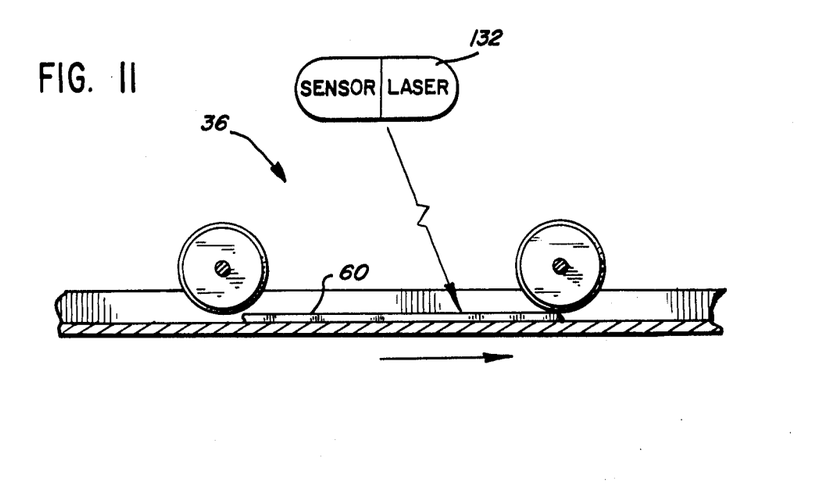
FIG. 11 is a side view of a code scanner utilized by the system according to the invention.
Figure 12:
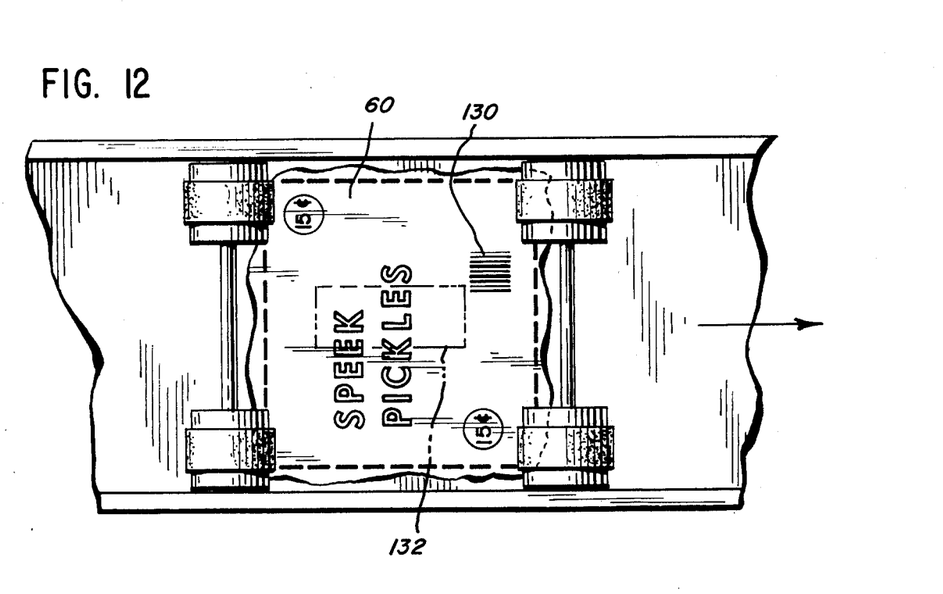
FIG. 12 is a top view of a merchandise coupon being transported through the code scanner illustrated in FIG. 11.

The code on the coupon 60, such as a bar code 130, is scanned by a scanner, such as a laser scanner 132 (FIGS. 11 and 12), which forms the scanning portion of the code scanner 36. The scanning laser and sensor combination 132 can be placed anywhere along the transport path of the coupon 60 to read the code 130.

Figure 13:
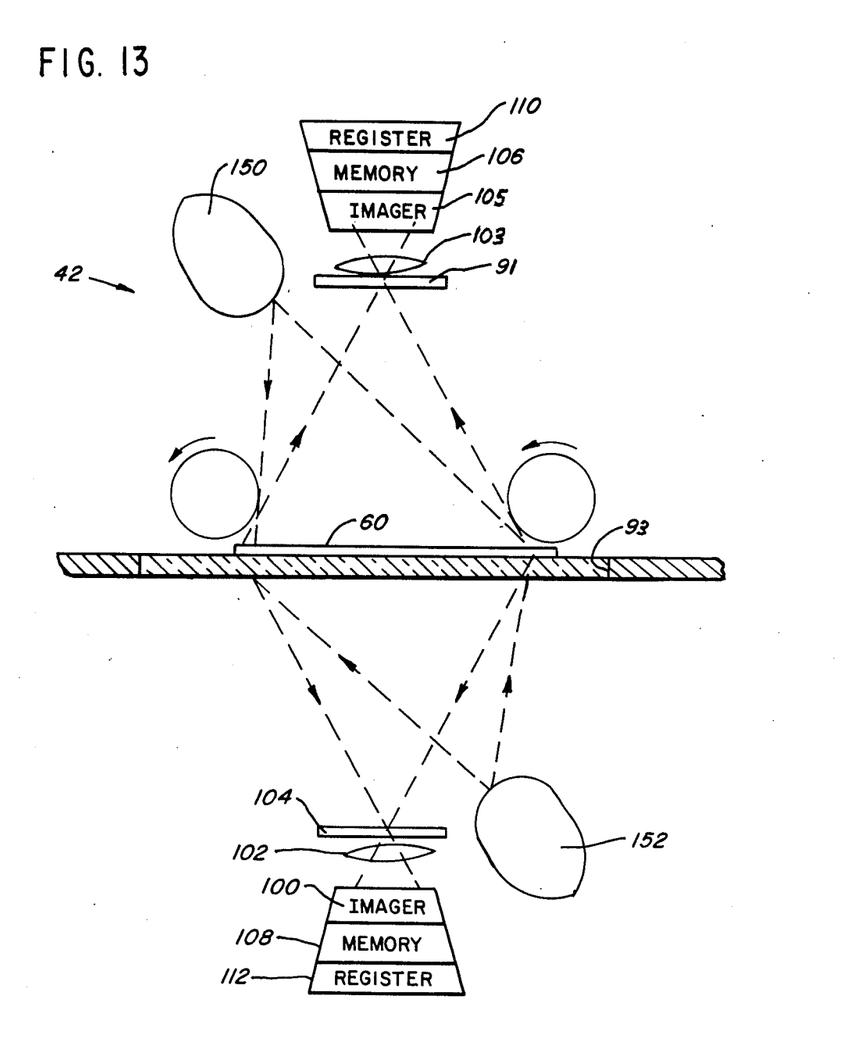
FIG. 13 is a side view of an image reader utilized by the system according to the invention.

The histogram generating system of the image digitizer 42 utilizes a pair of strobe flashes 150 and 152 (FIG. 13) to stop the motion of the coupon 60 as it passes across a window 93; however, any stop motion device such as a steady light source and shutter can be used. The image of one side of the coupon is passed through a shutter 91 and an optical system illustrated as a lens 103 onto an imaging screen 105. Similarly, the image of the other side of the coupon is imaged onto an imaging screen 100 by optics including a lens 102 and a shutter 104. The imagers 100 and 105 are scanned, and the contents thereof are stored in a pair of respective memories 106 and 108. The images 100 and 105 may be standard imaging targets, such as those used in vidicon tubes or photodiode arrays; however, in both cases the analog signals from the imagers 100 and 105 must be digitized prior to storage in the respective memories 106 and 108. The outputs of the memories 106 and 108 are then applied to corresponding registers 110 and 112 to permit the image representative data to be manipulated as previously described.

While a particular embodiment of the sorting system according to the invention has been described, it should be realized that many variations of the total system are possible. For example, the sequence of the sorting processes can be altered to suit the particular type of document being scanned in order to sort as many documents with a few steps as possible. In addition, some of the steps inappropriate to a particular type of document may be eliminated. Thus, the thickness sensor may be eliminated when all of the documents to be sorted are the same thickness, and the code scanner can be eliminated when no documents containing a code are being scanned. In addition, various ones of the systems, such as the physical properties scanners, can be used alone to provide a stand-alone system capable of providing a relatively rough sort for applications where such a sort is adequate. Thus, since many modifications and variations of the present invention are possible in light of the above teachings, it is to be understood that, within the scope of the appended claims, the invention may be practiced otherwise than as specifically described above.

What is claimed and desired to be secured by Letters Patent of the United States is:

1. A system for sorting documents comprising: means responsive to a predetermined property of said documents for categorizing said documents into groups according to predetermined values of said property, said categorizing means including means responsive to the value of said property of each document for determining whether said value is unique to a particular class of documents, said uniqueness determining means including means for identifying said document when said value is unique to a particular class of documents; and means responsive to a predetermined characteristic of said documents other than said property for categorizing the documents having values of said property that are not unique to a particular class of documents into groups according to predetermined parameters of said characteristic and the value of said property, said characteristic responsive categorizing means including means responsive to the parameters of said characteristic and the value of said property of each document for determining whether the combination of said parameter of said value is unique to a particular class of documents and for identifying said document when said combination is unique to a particular class of documents.

2. A system as recited in claim 1 wherein said categorizing means includes means responsive to at least one predetermined property of a group of predetermined properties including the properties of size, thickness, color, opacity, reflectivity and luminescence.

3. A system as recited in claim 2 wherein said color determining means includes a plurality of photoelectric sensors disposed in proximity to said document, each photoelectric detector being responsive to a different color of light reflected by said document.

4. A system as recited in claim 2 wherein said opacity determining means includes a source of light disposed adjacent to one surface of said document and a photoelectric detector disposed on the opposite surface of said document, said photoelectric detector being positioned to detect light from said source passing through said document.

5. A system as recited in claim 2 wherein said reflectivity determining means includes a source of light disposed adjacent to one surface of said document and a photoelectric detector also disposed adjacent to said one surface, said photoelectric detector being positioned to receive light from said source that is reflected from said one surface of said document.

6. A system as recited in claim 2 wherein said luminescence determining means includes a source of ultraviolet radiation disposed adjacent to one surface of said document and a photoelectric detector disposed adjacent to said one surface, said photoelectric detector being positioned to receive luminescent radiation that is emitted from said surface.

7. A system as recited in claim 2 wherein said size determining means includes first and second light sensitive arrays, said first array being responsive to the width of said document and said second array being responsive to the length of said document.

8. A system as recited in claim 2 wherein said thickness determining means includes a displaceable element engageable by said document, said displaceable element being displaced a distance proportional to the thickness of said document upon engagement thereby.

9. A system as recited in claim 8 wherein said displaceable element includes a roller.

10. A system as recited in claim 9 further including means coupled to said roller for determining the displacement thereof.

11. A system as recited in claim 1 wherein said predetermined characteristic responsive means includes means for detecting markings that appear on one side of the document.

12. A system as recited in claim 11 wherein said predetermined characteristic determining means further includes means for detecting markings appearing on the other side of the document.

13. A system as recited in claim 11 wherein said marking detecting means includes means for detecting alphanumerics.

14. A system as recited in claim 11 wherein said marking detecting means includes means for detecting a code.

15. A system as recited in claim 14 wherein said code detecting means includes means for detecting a bar code.

16. A system as recited in claim 11 wherein said system includes means for forming an image of said one side of said document and means for providing a digital representation of said image.

17. A system as recited in claim 16 wherein said digital representation providing means includes memory means including a plurality of individual cells for storing at least a portion of said image in the form of digital data in said individual cells and means for generating a multiple bit digital word in response to the digital data stored in predetermined ones of said cells.

18. A system as recited in claim 17 wherein said digital representation providing means includes means for selecting said predetermined ones of said cells and means for altering the selection of said cells to thereby provide a different digital representation representative of an image of a different portion of said document.

19. A system as recited in claim 17 wherein said digital word generating means includes means for combining the data stored in a predetermined plurality of said cells to form one bit of said digital word.

20. A system as recited in claim 19 further including means for storing a plurality of second digital words each representative of a predetermined class of documents and means for comparing said digital word with said second digital words for identifying said document.

21. A system for sorting documents comprising:
means responsive to predetermined physical properties of said documents for providing first signals indicative of the values of said physical properties;
means for storing indications of predetermined values of said predetermined physical properties and for storing indications of the identities of documents having values of said physical properties lying in ranges of values between said predetermined values;
means responsive to said first signals and to said stored indications of predetermined values of said predetermined physical properties for comparing the values represented by said first signals and said indications of predetermined values to determine the ones of said ranges of values corresponding to the values represented by said first signals to thereby determine the identities of documents having values of said physical properties corresponding to the values represented by said first signals and to identify said documents uniquely when the values of the physical property represented by said first signals fall within ranges of values corresponding to only a single stored indication of identity;
means responsive to predetermined characteristics other than said predetermined physical properties of the documents not uniquely identified for providing second signals indicative of predetermined parameters of said characteristics;
means for storing indications of the parameters of characteristics of a plurality of documents; and
means responsive to said second signals and said parameter indications for identifying the documents having parameter indications corresponding to the parameter represented by said second signals.

22. A system as recited in claim 21 further including means for reading identifying codes imprinted on said document.

23. A system as recited in claim 21 wherein said first signal providing means includes means responsive to at least one physical property of a group of predetermined physical properties including size, thickness, color, opacity, reflectivity and luminescence of said document, and said storing means includes means for storing indications of values of said one of said physical properties.

24. A system as recited in claim 21 wherein said second signal providing means includes means responsive to markings on one surface of said document for providing a digital indication of at least some of said markings, and said means for storing indications of the parameters of characteristics includes means for storing digital representations of some of the markings present on predetermined documents.

25. A system as recited in claim 21 wherein said second signal providing means includes means for scanning a predetermined area of the surface of said document for reading the markings thereon, and means for altering the area scanned in order to scan a second predetermined area of said document, said second predetermined area being smaller than said predetermined area.

26. A method of identifying documents comprising the steps of: sorting the documents according to a set of first properties to classify said documents into classes according to combinations of the values of said first properties; identifying the documents classified according to a combination of values of said first properties that uniquely represent a particular type of document; sorting the documents contained in at least some of said classes that do not uniquely represent a particular type of document according to the various combinations of various ones of said first properties and various ones of a set of second properties to classify said documents into classes according to various combinations of values of said first properties and various combinations of values of said second properties; identifying the documents classified according to a combination of values of said first and second properties that uniquely represent a second particular type of document; continuing the sorting of said previously classified documents that have not been identified according to various combinations of said first, said second and other properties to further classify said documents into classes according to various combinations of values of said first, said second and other properties; and identifying the documents classified according to a combination of said first, said second and other properties that uniquely represent a further particular type of document.

* * * * *